Apr. 10, 1923.
C. H. GOTTSCH
1,450,956
DRAINPIPE TRAP
Filed June 12, 1922
2 sheets-sheet 1
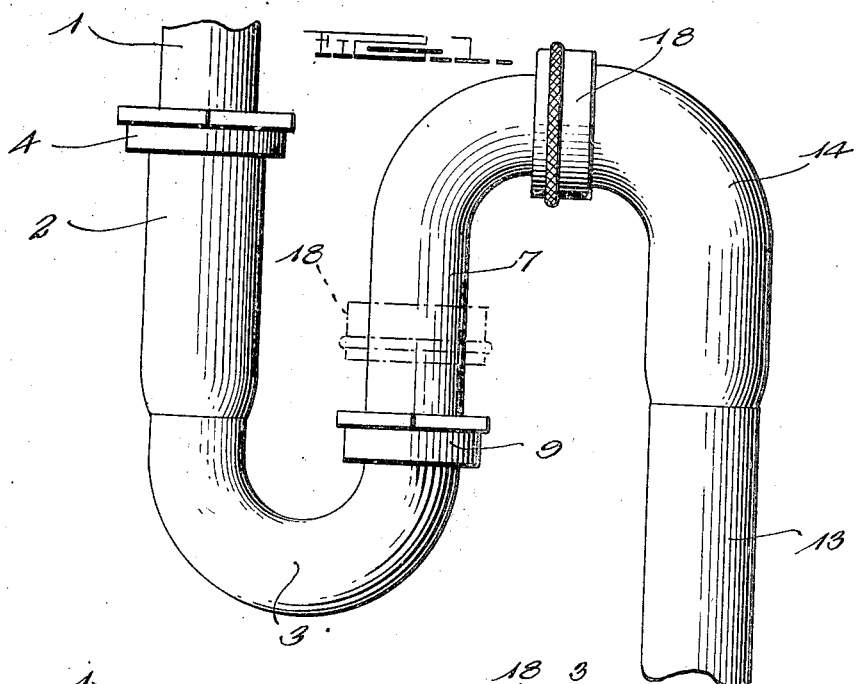
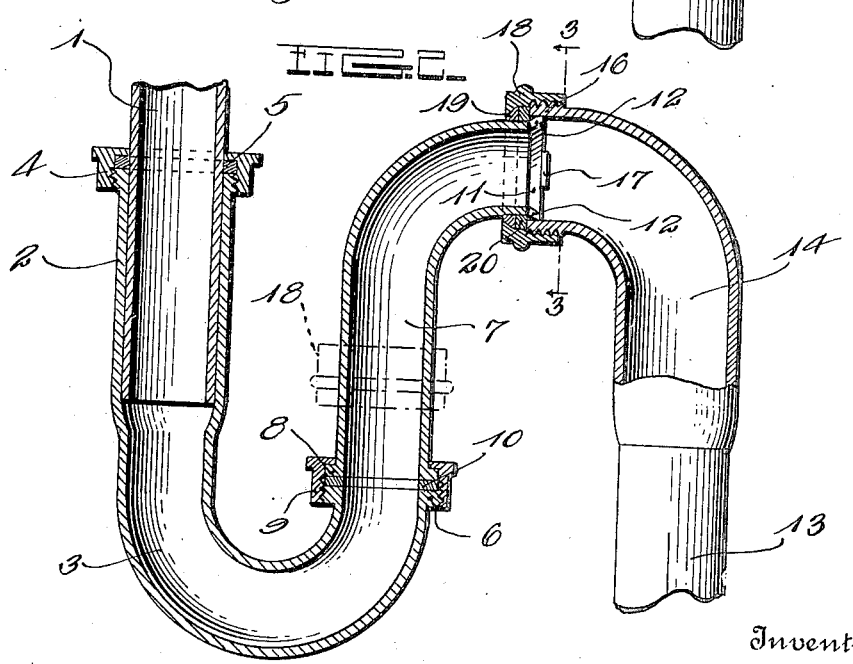
Inventor
C. H. Gottsch
Witness
Attorneys

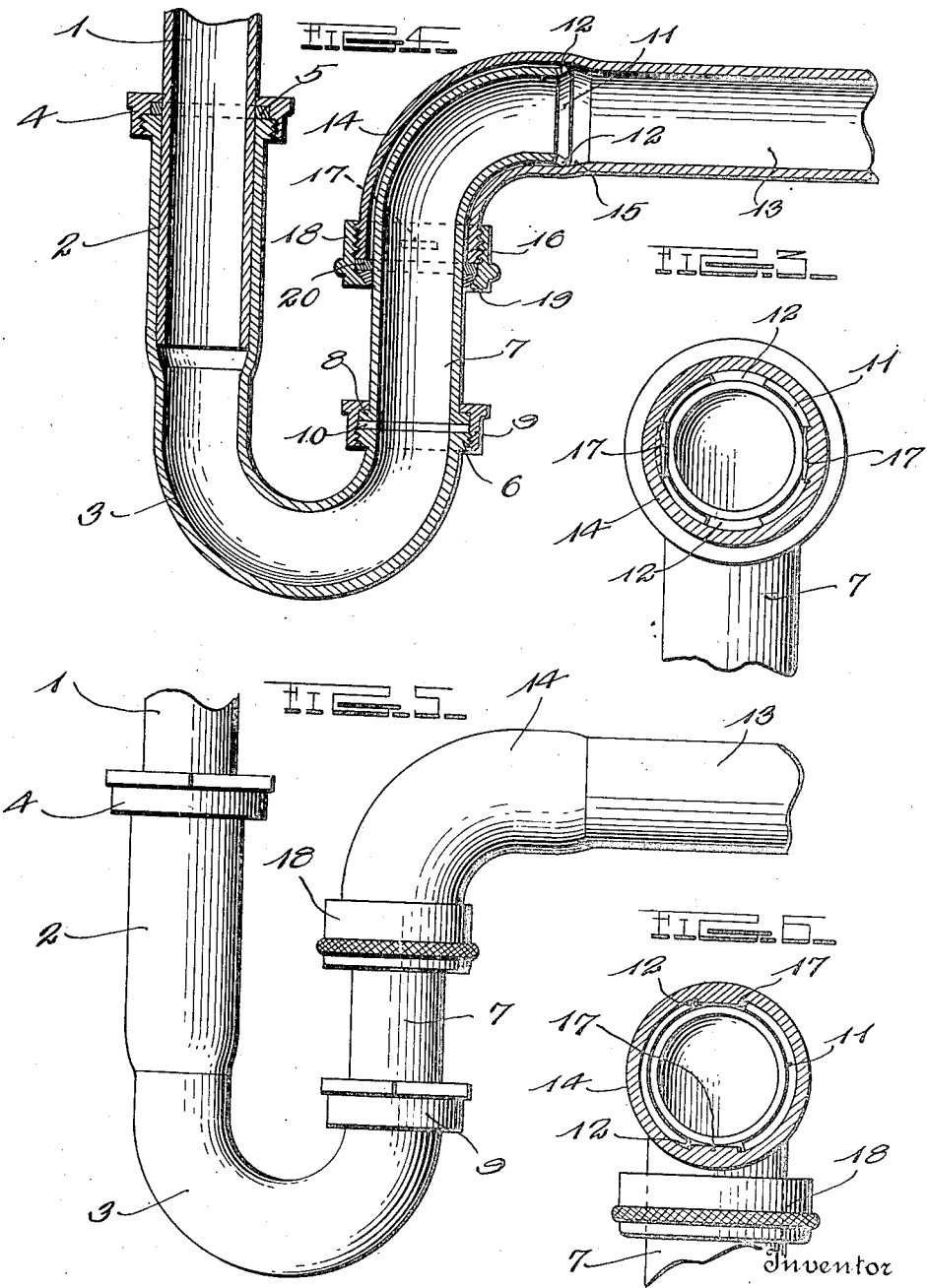

Patented Apr. 10, 1923.

1,450,956

UNITED STATES PATENT OFFICE.

CHRISTIAN H. GOTTSCH, OF NEW HYDE PARK, NEW YORK.

DRAINPIPE TRAP.

Application filed June 12, 1922. Serial No. 567,648.

*To all whom it may concern:*

Be it known that I, CHRISTIAN H. GOTTSCH, a citizen of the United States, residing at New Hyde Park, Long Island, in the county of Nassau and State of New York, have invented certain new and useful Improvements in Drainpipe Traps, of which the following is a specification, reference being had therein to the accompanying drawing.

This invention relates to an improved trap for a drain pipe such as it is customary to provide for kitchen sinks, wash basins and the like and one object of the invention is to provide a trap including pipe sections in the form of elbows and so connected and constructed that one of the pipe elements may be caused to extend either in a horizontal position for connection with a pipe projecting from the wall at a point above the floor or in a vertical position so that this pipe may be connected with a pipe at the floor.

Another object of the invention is to provide a trap including sections so connected and constructed that one of the elements may be caused to extend at any angle toward the wall or floor for the purpose of connection with a pipe projecting from the wall or floor.

Another object of the invention is to so construct the two pipe sections that one may fit into or against the other and the second turned to any desired angular relation with respect to the first and secured without leakage occurring between the two pipes.

Another object of the invention is to so construct these pipe sections that the inner pipe may be prevented from moving through the outer pipe beyond a desired amount.

This invention is illustrated in the accompanying drawings, wherein:

Figure 1 is a view in side elevation showing the trap with the adjustable pipe section positioned to extend downwardly for connection with a pipe projecting through the floor.

Figure 2 is a longitudinal sectional view through the structure shown in Fig. 1.

Figure 3 is a transverse sectional view taken along the line 3—3 of Fig. 2.

Figure 4 is a view similar to Fig. 2 showing the pipe sections assembled for connection with a pipe projecting through the wall of a room or building.

Figure 5 is a view showing the structure of Fig. 4 in side elevation.

Fig. 6 is a sectional view similar to Fig. 3 and showing the method of assembling the pipe sections when assembled as shown in Figs. 4 and 5.

In a sink or basin outlet pipe construction, it is customary to provide an outlet pipe 1 which will have its upper end portion adapted for connection with the basin or sink and has its lower end portion extending into the enlarged pocket-forming portion 2 of the elbow 3. The upper end portion of this pocket is externally threaded and carries a packing gland or cap 4 which when moved downwardly upon the pipe 1 and screwed onto the upper end portion of the elbow 3 will compress the gasket 5 about the pipe 1 and thus form a tight joint between the pipe 1 and elbow 3 and prevent leakage as well as holding the elbow firmly in place upon the pipe 1. This elbow is provided at its other end with a threaded collar 6 and at present it is customary to connect a pipe section with this end of the elbow 3 and have the pipe sections formed either to extend through the wall or to the floor after completing the trap. It will thus be seen that as constructed at the present time, it is necessary to provide a pipe section of a specific curvature to extend to the wall and a second pipe section of a specific curvature to extend to the floor. This causes extra expense as it is necessary to provide a pipe section of a special curvature in order to connect the elbow with a pipe extending from the wall and another pipe of a special curvature for connection with a pipe extending through the floor.

In the improved construction, a short pipe section 7 which is provided with a curved upper end portion has its lower end provided with an outstanding shoulder 8 for engagement by a packing gland or collar 9. A gasket 10 is placed between the end of the elbow 3 and lower end of the pipe section 7 and when the securing nut or collar 9 is screwed down onto the threaded shoulder 6 with the flange engaging the shoulder 9, a tight and water-proof joint will be formed. The upper end portion of this short pipe section or elbow 7 terminates in a flared end 11 forming an outstanding flange which is provided at diametrically opposed points with cutouts or notches 12. The pipe section 13 will be formed in stock sizes so that it can be cut to the right length for extending to the pipe projecting through the wall or floor with a minimum amount of waste and when in place, this pipe section 13 will be connected with the pipe projecting through the wall or floor in a conventional manner. The end portion of the pipe 13 which is to be connected with the pipe section or elbow 7 is curved to provide an elbow portion conforming to the curvature of the elbow 7 and this pipe section 13 has its curved end portion expanded to provide a pocket 14 having a shoulder portion 15 at its inner end engageable by the outstanding flange 11 of the pipe section or elbow 7 to limit inward movement of this elbow 7 through the curved end portion of the pipe 13. At its end, the pocket portion 14 is provided with a neck or collar portion 16 which is externally threaded and intermediate the depth of this threaded portion 16, there has been provided internal lugs 17 positioned diametrically opposite each other and adapted to engage the flange 11 or pass through the notches 12 according to the position of the pipe 13 with respect to the elbow 7 when these two pipe sections are put together. A packing gland or sleeve nut 18 is slidable upon the pipe section or elbow 7 and in the form shown is provided with a pipe passage of sufficient size to permit insertion of a metal ring 19 for engaging the gasket 20 and forcing the gasket into tight engagement with the end of the pipe 13 and into close engagement with the sides of the pipe 7 when the gland 18 is screwed tightly upon the threaded portion 16 of the pipe 13.

When this drain pipe construction is being installed, the pipe 1 will be connected with the basin or sink in the usual manner and the elbow 3 will be secured upon the lower end portion of the pipe 1 in the ordinary manner as shown. The elbow or pipe 7 will then be connected with the free end portion of the elbow 3, it being understood however that the washer 20, ring 19 and securing sleeve 18 are already in place upon the pipe 7. The pipe 13 is now to be connected with the pipe or elbow 7. If the pipe 13 is to connect the pipe 7 with a pipe projecting through the floor, the pipe 13 will be put in place as shown in Figs. 1 and 2 with the flange 11 of the pipe 7 extending into the curved upper end portion of this pipe 13 a sufficient distance to engage the lugs 17. The packing gland or sleeve nut 18 will now be screwed onto the threaded end portion of the pipe 13 and the curved end portion 14 of this pipe will be securely connected with the curved end portion of the pipe 7 and provide a water-tight joint. The lower end portion of the pipe 13 will be connected with the pipe projecting through the floor in the usual manner. If it is desired to have the pipe 13 extend horizontally or at an angle below the horizontal for connection with a pipe projecting through the wall at a point above the floor, the pipe 13 will first be disposed horizontally so that the lugs 17 may pass through the notches 12 as shown in Fig. 6. After the lugs have been passed through the notches of the flange 11, the pipe 13 is swung downwardly to the vertical position and will then be turned upwardly towards a horizontal position at right angles to the direction of its previous swing. As this pipe turns upwardly to the horizontal position, the curved upper end portion of the pipe or elbow 7 will move through the pocket 14 until its inner end engages the shoulder 15 and limits further inward movement. When in this position, it will be positioned horizontally as shown in Figs. 4 and 5, and the securing nut or gland 18 can then be screwed onto the threaded end portion 16 to secure the pipe in the proper position and provide a water-tight joint between the pipe 7 and the pipe 13. Of course if the pipe 13 is to extend at some angle below the horizontal, the upward swing towards the position shown in Figs. 4 and 5 will be stopped at the proper point. It will thus be seen that with this construction, the pipe 13 which is to be connected with the pipe which projects through the wall or floor, may be secured to the pipe 7 with the pipe 13 extending either horizontally or vertically or at any desired angle between the vertical and the horizontal positions shown. It will be further noted that with this construction, it is not necessary to provide a special construction where it is desired to have the pipe 13 positioned horizontally and another construction where it is desired to have the pipe positioned vertically or at some other angle.

I claim:

1. In a drain pipe trap construction, a trap member, a pipe section connected with said trap member and having a curved end portion, a second pipe section having a curved end portion conforming to the curvature of the curved end portion of the first mentioned pipe section and adapted for telescopic engagement therewith, and means for securing the curved end portions of said pipe sections with the second pipe section selectively extended either parallel to the first pipe section or in diverging relation thereto.

2. In a drain pipe construction, a trap member, a pipe section connected with said trap member and having a curved end portion, a second pipe section having a curved end portion conforming to the curvature of the curved end portion of the first section and adapted for telescopic engagement therewith whereby the second pipe section may be positioned to extend either parallel to or in diverging relation to the first pipe section, means for limiting insertion of one of the pipe sections into the other when the pipe sections are positioned parallel to each other, and means for securing said pipe sections and providing a tight joint with the pipe sections in the desired angular relation to each other.

3. The structure of claim 1 having the first pipe section provided with an outstanding flange at its curved end, said collar being provided with notches spaced about its circumference, the second pipe section being provided with internal lugs for engaging said flange and limiting movement of the first pipe section into the second pipe section when the pipe sections are in parallel planes, said lugs being positioned to pass through said notches with the pipe sections out of a parallel position and permit movement of the pipe sections to a position in diverging relation to each other after return to the parallel position, and means for securing the pipe sections and provide a water-tight joint.

In testimony whereof I hereunto affix my signature.

CHRISTIAN H. GOTTSCH.